US012653239B2

(12) United States Patent
Hon et al.

(10) Patent No.: US 12,653,239 B2
(45) Date of Patent: Jun. 16, 2026

(54) VAPORIZING DEVICE WITH INDUCTION HEATER

(71) Applicant: FONTEM VENTURES B.V., Amsterdam (NL)

(72) Inventors: Lik Hon, Beijing (CN); Zhuoran Li, Beijing (CN); Fucheng Yu, Beijing (CN)

(73) Assignee: FONTEM VENTURES B.V., Amsterdam (NL)

( * ) Notice: Subject to any disclaimer, the term of this patent is extended or adjusted under 35 U.S.C. 154(b) by 427 days.

(21) Appl. No.: 17/754,675

(22) PCT Filed: Oct. 29, 2019

(86) PCT No.: PCT/CN2019/113937

§ 371 (c)(1),
(2) Date: Apr. 8, 2022

(87) PCT Pub. No.: WO2021/081742

PCT Pub. Date: May 6, 2021

(65) Prior Publication Data

US 2024/0074504 A1 Mar. 7, 2024

(51) Int. Cl.
*A24F 40/10* (2020.01)
*A24F 40/40* (2020.01)
(Continued)

(52) U.S. Cl.
CPC ............ *A24F 40/465* (2020.01); *A24F 40/10* (2020.01); *A24F 40/48* (2020.01); *A24F 40/51* (2020.01); *H05B 6/108* (2013.01)

(58) Field of Classification Search
None
See application file for complete search history.

(56) References Cited

U.S. PATENT DOCUMENTS 4,355,222 A * 10/1982 Geithman .................. C09J 5/06 219/674
5,613,505 A 3/1997 Campbell et al.
(Continued)

FOREIGN PATENT DOCUMENTS

CN 201445686 U 5/2010
CN 104382238 A 3/2015
(Continued)

OTHER PUBLICATIONS

Dielectric Properties, Aug. 14, 2020, BYJUS. https://byjus.com/physics/dielectric-properties/ (Year: 2020).*
(Continued)

*Primary Examiner* — Philip Y Louie
*Assistant Examiner* — Nicole A Szumigalski
(74) *Attorney, Agent, or Firm* — Perkins Coie LLP; Kenneth H. Ohriner

(57) ABSTRACT

A vaporizing device (10) includes a battery unit (12) having a battery (13), an electronic controller (20), and an induction coil (32) on or in a core, such as a ferrite split ring (34) or cup (62) magnetic core. A cartridge (14) holding liquid has at least one heater plate (46, 74) and a liquid conductor (48, 76). The cartridge (14) is attachable to the battery unit (12) with the heater plate (46, 74) adjacent to the core. The heater plate (46,74) heats the liquid conductor (48, 76) to create vapor when high frequency alternating electric current is provided to the induction coil (32). This offers manufacturing and cost advantages.

5 Claims, 3 Drawing Sheets

(51) Int. Cl.

| | |
|---|---|
| ***A24F 40/465*** | (2020.01) |
| ***A24F 40/48*** | (2020.01) |
| ***A24F 40/51*** | (2020.01) |
| ***H05B 6/10*** | (2006.01) |

(56) References Cited

U.S. PATENT DOCUMENTS

| | | | | |
|---|---|---|---|---|
| 6,155,268 | A | 12/2000 | Takeuchi | |
| 2002/0078956 | A1 * | 6/2002 | Sharpe | A61M 11/042 128/203.26 |
| 2009/0095311 | A1 | 4/2009 | Han | |
| 2011/0215755 | A1 | 9/2011 | Hwang et al. | |
| 2011/0265806 | A1 | 11/2011 | Alarcon et al. | |
| 2012/0234315 | A1 | 9/2012 | Li et al. | |
| 2014/0020697 | A1 | 1/2014 | Liu | |
| 2014/0224267 | A1 | 8/2014 | Levitz et al. | |
| 2015/0245669 | A1 * | 9/2015 | Cadieux | A24F 40/42 131/329 |
| 2017/0105452 | A1 * | 4/2017 | Mironov | H05B 1/0244 |
| 2018/0116288 | A1 | 5/2018 | Hu | |
| 2018/0192700 | A1 | 7/2018 | Fraser | |
| 2020/0343767 | A1 | 10/2020 | Alarcon | |
| 2022/0167672 | A1 * | 6/2022 | Moloney | A24F 40/10 |

FOREIGN PATENT DOCUMENTS

| | | | |
|---|---|---|---|
| CN | 104856234 | A | 8/2015 |
| CN | 105962419 | A | 9/2016 |
| CN | 106455711 | A | 2/2017 |
| CN | 206808660 | U | 12/2017 |
| WO | 2018184787 | A1 | 10/2018 |

OTHER PUBLICATIONS

ISA/CN (CNIPA), International Search Report and Written Opinion for International Application No. PCT/CN2019/113937 dated Jul. 24, 2020, 11 pages.

EPO, extended European Search Report for Application No. 19950417.6 dated Jun. 30, 2023, 11 pages.

* cited by examiner

VAPORIZING DEVICE WITH INDUCTION HEATER

FIELD OF THE INVENTION

Electronic cigarettes or vaporizing devices are increasingly used by smokers as a substitute for real tobacco cigarettes. In general, these devices typically use a wire heater, often provided as a coil, to vaporize liquid nicotine, or other liquid substances. The user's inhalation on a mouthpiece may be detected by a sensor, causing an electronic circuit to supply electrical current from a battery to the heater. The wire coil heater provides heat, which creates the vapor from the liquid. The user's inhalation typically also draws ambient air into one or more inlets in the vaporizing device housing. The vapor is entrained in the air flow moving through the housing and is inhaled by the user.

Vaporizing devices have several advantages over real tobacco cigarettes. Initially, the risks of lung cancer associated with real tobacco cigarettes is largely reduced or avoided, as the tar and other chemicals in tobacco linked to lung cancer are not present in a vaporizing device. Vaporizing devices generate vapor and not smoke. Consequently, there is no comparable second-hand smoke problem with use of vaporizing devices. In addition, since there is no burning material in a vaporizing device, the risk of fire is reduced.

Many vaporizing devices have been proposed and used, with varying degrees of success. Existing designs though have various disadvantages, including leakage of liquid causing failure of internal electronic components and/or degradation or contamination of the liquid. In designs where the liquid contacts the wire heater, the heater performance may be degraded by corrosion of electrical components or connections, or buildup of residue. Accordingly, there is a need for an improved vaporizing device.

BRIEF STATEMENT OF THE INVENTION

A new vaporizing device has now been invented that provides significant improvements over existing designs.

In a first aspect, an induction heater in a vaporizing device allows the heating element to be separated or sealed off from the electrical or electronic components. Potential for liquid leaking onto the electrical or electronic components is avoided. In another aspect, a replaceable or disposable liquid cartridge has an induction energy collection component, with no electrical or electronic components needed in the cartridge. This offers manufacturing and cost advantages.

In one embodiment, a vaporizing device includes a battery unit having a battery, an electronic controller, and a wire coil on or in a core, such as a ferrite split ring magnetic core or a cup magnetic core. A cartridge holding liquid has at least one heater plate and a liquid conductor. The cartridge is attachable to the battery unit with the heater plate adjacent to the core. The heater plate heats the liquid conductor to create vapor when high frequency alternating electric current is provided to the wire coil.

Other and further objects and advantages will become apparent from the following detailed description which is provide by way of example, and is not intended as a statement of the limits of the invention. The invention resides as well in sub-combinations of the elements and steps described.

BRIEF DESCRIPTION OF THE DRAWINGS

In the drawings, the same element number indicates the same element in each of the views.

DETAILED DESCRIPTION

Figure 1:
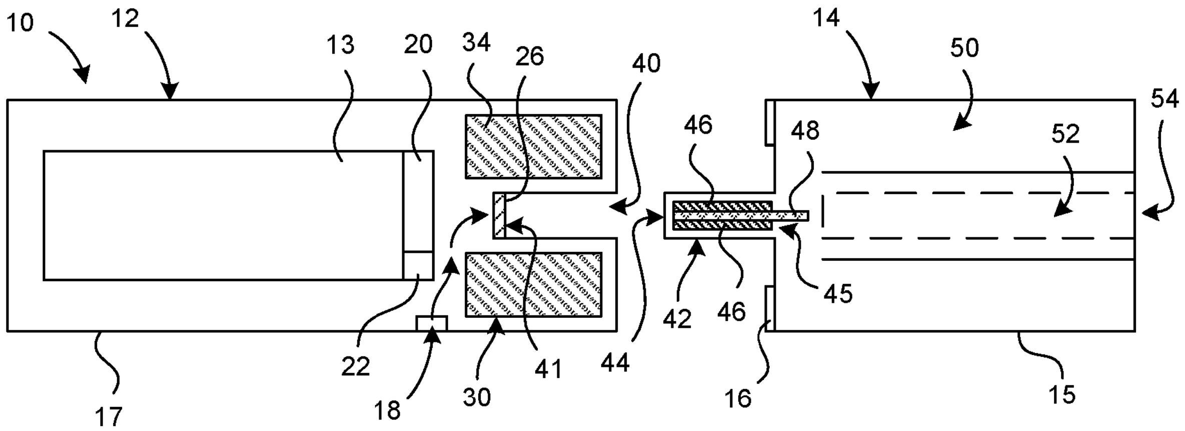
FIG. 1 is a schematic section view of a new vaporizing device.

As shown in FIG. 1, a vaporizing device 10 may have a size and shape generally comparable to a real tobacco cigarette. The vaporizing device 10 is made up of a battery unit 12 and a cartridge 14, which is attachable to, and removable from the battery unit 12 using an attachment 16, such as a plug-in friction fit, a detent or snap fit, screw threads, bayonet fitting, etc. At least one inlet 18 is provided in the housing 17 of the battery unit 12 to provide a first air flow path from the inlet 18 to a recess or slot 40 in the back end of the battery unit 12. The battery unit 12 contains a battery 13 electrically connected to an electronic controller 20, which includes a high frequency alternating current generator, and may include a processor and memory. An inhalation sensor 22 is electrically connected to the electronic controller 20. An induction heater 30 is positioned within the housing of the battery unit 12, around the recess 40.

Figure 3:
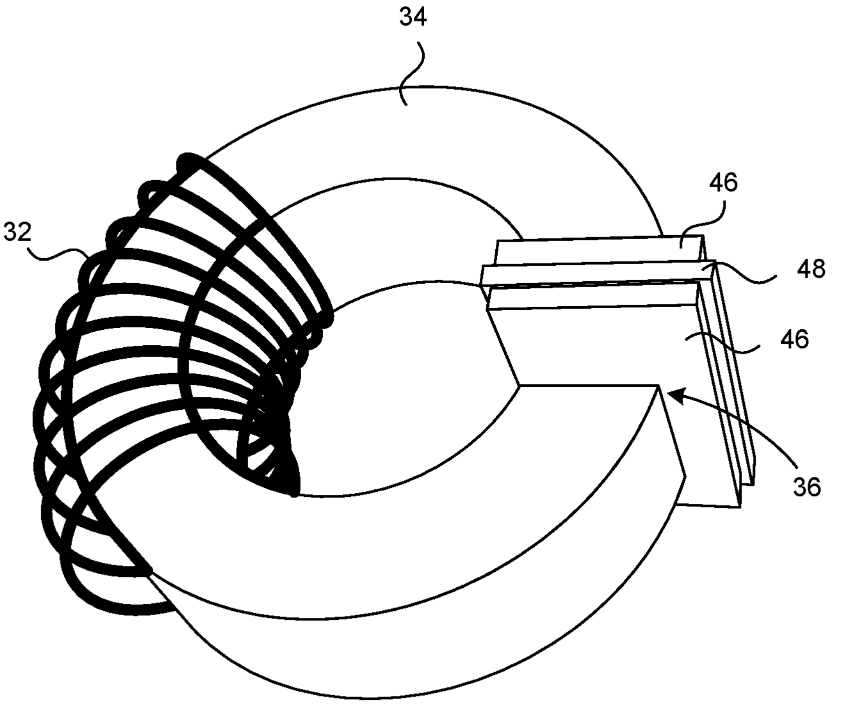
FIG. 3 is a perspective view of the induction heater in the vaporizing device shown in FIG. 1.

Referring now to FIGS. 1 and 3, the induction heater 30 has a wire induction coil 32 wound around or on a split ring 34 typically made of ferrite. The wire induction coil 32 is electrically connected to the electronic controller. The split ring 34 is not a continuous 360° ring. Rather, an opening or gap 36 of about 1 to 5 mm is provided in the split ring 34. In the example shown, the wire induction coil 32 is opposite from the gap 36, and extends over a angular sector of about 35 to 55°. In alternative designs, the wire induction coil 32 may be wound around a majority of the circumference of the split ring 34, with the wire induction coil extending over an angular section of up to 315°. The electronic controller 20 is adapted to switch on high frequency alternating electric current to the wire induction coil 32 when a sensor detects inhalation on the outlet 102.

Figure 2:
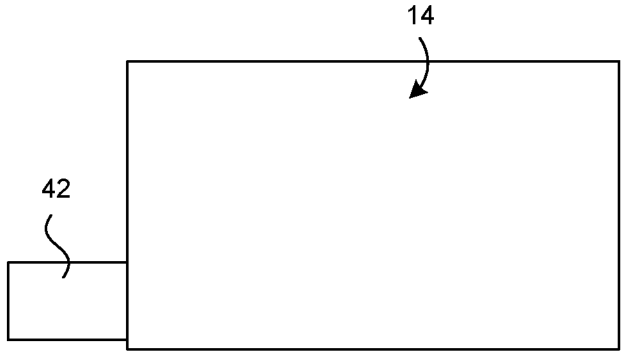
FIG. 2 is a schematic side view of the cartridge shown in FIG. 1, rotated ¼ turn.

As shown in FIGS. 1 and 2, a projection or tab 42 extends out from a front end of the main body 15 of the housing of the cartridge 14. A plate assembly 45 is positioned within the projection 42. The plate assembly 45 includes a liquid conductor 48, such as a layer of glass fiber material, sandwiched between first and second heater plates 46, for example made of nickel or other material which can be heated by induction. Generally, the liquid conductor 48 is in direct contact with the heater plates 46. However, in some designs, an intermediate film, layer, or space may be provided between them. In either case the liquid conductor 48 is heatable by the heater plate 46. An alternative plate assembly may use only a single heater plate. The heater plate 46 may be a solid material or a mesh. A liquid container or space 50 in the cartridge may optionally surround a central channel 52 extending from the plate assembly 45 to an outlet 54. The liquid container 50 may be filled with a saturated absorbent material, such as fiber material, or it may contain liquid only. The liquid container may be a component separate from the housing, or it may be formed in whole or part by the housing.

Generally, the battery unit 12 and the cartridge 14 have the same cross section, such as a round cross section. In this case both the battery unit 12 and the cartridge 14 are elongated cylinders. However, the battery unit 12 and the cartridge 14 may also have other shapes, and the shape of the battery unit 12 may be different from the shape of the cartridge 14. Similarly, while the recess 40, the projection 42 and the plate assembly 45 are shown as rectangular in FIGS. 1 and 2, they may be provided in other configurations. The housing 17 of the battery unit 12, at least around the recess 40, and the projection 42 of the cartridge, are made of a non-conductive or dielectric material, to avoid interfering with operation of the induction heater 30.

In use, the cartridge 14 is snapped, screwed, latched, or otherwise attached onto the battery unit 12, with the projection 42 inserted partly or fully into the recess 40. The space between the plate assembly 45 and the split ring 34 is minimized to increase the efficiency of the induction heater 30. For example, the projection 42, and/or the entire main body 15 of the cartridge may be made of a thin-wall plastic material. Or the wall thickness of cartridge housing may be reduced only at the projection 42.

Liquid is provided onto or into the liquid conductor 48 from the liquid container. Intermediate wicks, fiber materials or capillary tubes may be used for this purpose. When the user inhales on the outlet 54, the sensor 22 provides a signal to the electronic controller 20, which then provides high frequency alternating current to the wire induction coil 32. This creates eddy currents in the plates 26 which heats the plate assembly 45, including liquid in the liquid conductor 48. The liquid is heated into a vapor.

Air flow induced by the inhalation moves into the inlet 18 and through a first air flow path in the battery unit 12 to a recess air opening 41 in the recess 40. Air flowing out of the recess air opening 41 moves into a second air flow path in the cartridge 14 through a projection air opening 44 in the projection, over the plate assembly 45, and through the central channel 52 to the outlet 54. The air flowing through the cartridge mixes with the vapor created at the plate assembly 45, with the air and vapor flowing to the outlet 54 for inhalation by the user. A seal ring 26 may be provided in the recess 40 around the recess air opening 41 to substantially seal the first air flow path in the battery unit 12 with the second air flow path in the cartridge 14.

In an alternative design, the inlet 18 may be in the cartridge, avoiding the need for any air opening in the battery unit 12. This prevents any liquid from the cartridge from entering into the battery unit 12. In this design, the sensor 22 is also located in the cartridge 14, with signals from the sensor carried to the electronic controller 20 using non-contact techniques, or through a liquid resistant connector. Optionally, in this alternative design, the sensor 22 may be replaced with a manually operated switch on the battery unit.

Figure 4:
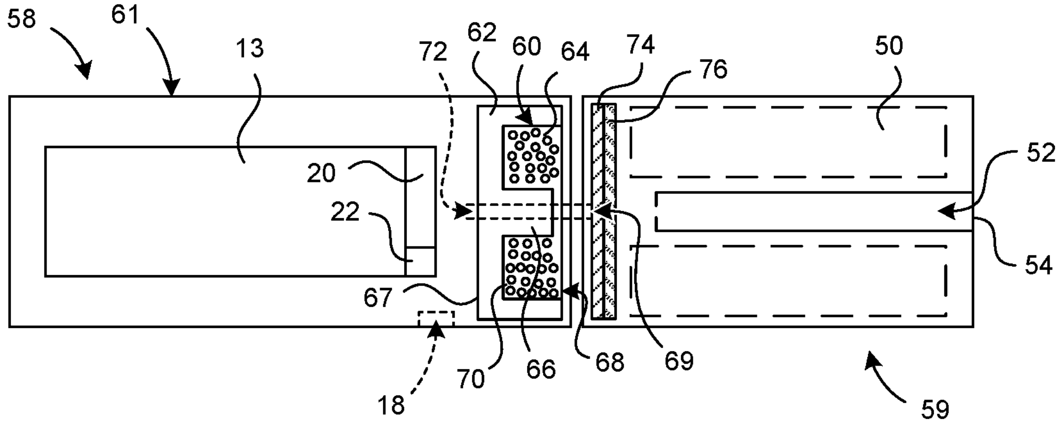
FIG. 4 is a schematic section view of a vaporizing device having another induction heater.
Figure 5:
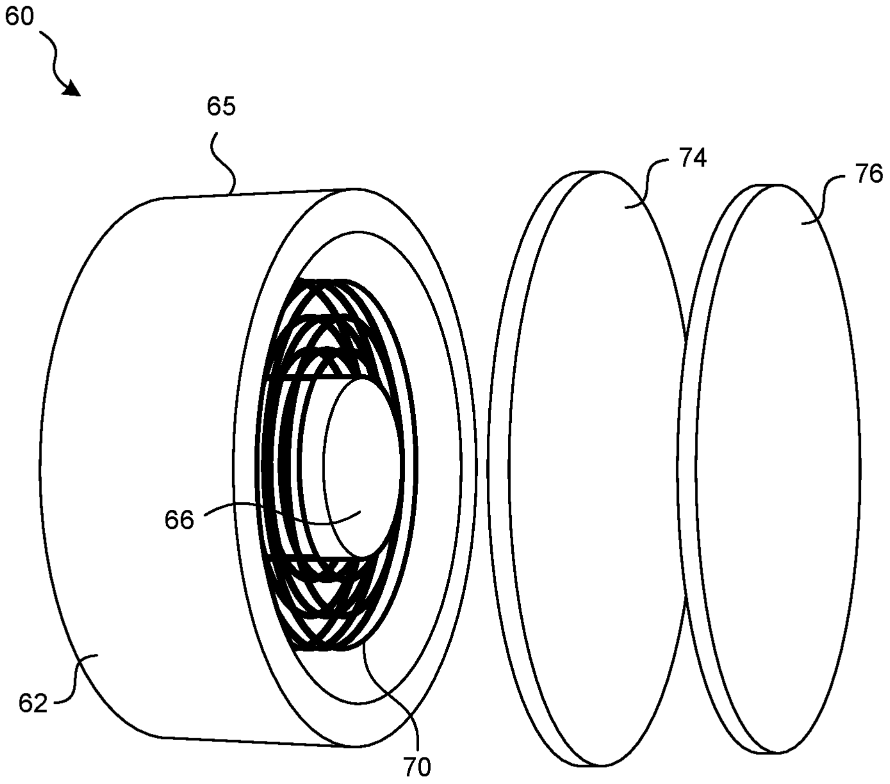
FIG. 5 is a perspective view of the induction heater in the vaporizing device shown in FIG. 4.

Turning now to FIGS. 4 and 5, in a second embodiment, an vaporizing device 58 has a cartridge 59 attachable to battery unit 61. The vaporizing device 58 has an induction heater 60 which includes a ferrite cup 62 and a wire induction coil 70 in the battery unit. The ferrite cup 62 has an annular space 64 radially between a center post 66 and an outer circumferential wall 65. The wire induction coil 70 is positioned in the annular space 64 around the center post 66. A front wall 67 closes off the front side of the annular space 64. The back 68 of the annular space 64 is open to better generate a high frequency electromagnetic field in the cartridge 59.

The cartridge 59 has a liquid container 50, a channel 52 and an outlet 54, similar to the cartridge 14. A heater plate 74 is positioned at the front end of the cartridge. A liquid conductor 76 contacts the heater plate 74 or is otherwise positioned to be heated by the heater plate 74. The heater plate 74 may be a plate or round disk of metal or metal mesh, or other material that can be heated by induction. The liquid conductor 76 may be a fiber or porous material, or an absorbent material, also optionally provided as a round disk.

In use, the cartridge 59 is attached to the battery unit 61. The space between the heater plate 74 and the ferrite cup 62 is minimized to increase the efficiency of the induction heater 60. Liquid is provided onto or into the liquid conductor 76 from the liquid container 50. When the user inhales on the outlet 54, the sensor 22 provides a signal to the electronic controller 20, which then provides a high frequency alternating current flow to the wire induction coil 70. This creates eddy currents in the heater plate 74 which heats the liquid conductor 48. Liquid in the liquid conductor is heated into a vapor.

Air flow induced by the inhalation moves into the inlet 18 and through a first air flow path 72, optionally passing through the ferrite cup 62, and through opening 69 in the back end of the battery unit housing. Air flowing out of the opening 69 moves into a second air flow path in the cartridge 59 through a front air opening in the cartridge aligned with the opening 69 in the battery housing. The air then flows over and around the heater plate 74 and through the central channel 52 to the outlet 54. The vapor generated at the liquid conductor 76 is entrained in the air flow and is inhaled by the user.

As with the first embodiment, the vaporizing device 58 of the second embodiment may be modified to provide the air inlet 18 in the cartridge, so that no air inlet in required in the battery unit 61. In this modification, the sensor 22 is in the cartridge with operation as explained above relative to FIGS. 1 and 3. For a manually operated device, a switch on the battery unit may be used instead of the sensor 22.

Except as described above, the vaporizing device 58 of the second embodiment may be the same as the vaporizing device 10 of the first embodiment. As used here, vaporizing device includes vaporizing devices generally. The ferrite split ring and the ferrite cup provide a magnetic core. Although a ferrite ring and a ferrite cup are described, the ring 34 and the cup 62 may of course be made of other types of magnetic core materials, such as iron, laminated steel, vitreous metals, ceramics, etc. Adjacent to means within 5 mm or less, or within 3 mm or less, so that the core and the heater plate are close enough together to allow the vaporizing device to provide at least 50 puffs on a single battery charge.

The examples and embodiments described herein are intended to illustrate various embodiments of the invention. As such, the specific embodiments discussed are not to be construed as limitations on the scope of the invention. It will be apparent to one skilled in the art that various equivalents, changes, and modifications may be made without departing from the scope of invention. The invention, therefore, should not be limited, except by the following claims, and their equivalents. Elements and features described in one embodiment may of course be included in other embodiments as well.

The invention claimed is:

1. A vaporizing device comprising:

a battery unit including a battery unit housing, a battery electrically connected to an electronic controller in the battery unit housing, the electronic controller having a high frequency alternating current generator, and a wire induction coil with a ferrite component;

an inhalation sensor electrically connected to the electronic controller;

a recess at a first end of the battery unit housing;

an air inlet in the battery unit housing, and a first air flow path from the inlet to the recess;

a cartridge having a first end attachable to the battery unit, the cartridge including a liquid container holding a liquid;

a projection extending out from the first end of the cartridge;

a second air flow path from a projection air opening in the projection through a single straight uniform central channel to an outlet at a second end of the cartridge;

a single rectangular heater plate in the projection, the heater plate comprising a flat metal mesh, the heater plate at least partially surrounded by the wire induction coil when the cartridge is attached to the battery unit;

a liquid conductor, separate from the heater plate, the liquid conductor contacting the heater plate and configured to wick the liquid from the liquid container to the heater plate;

wherein, when a user inhales on the outlet, the inhalation sensor provides a signal to the electronic controller, which then provides high frequency alternating current to the wire induction coil, creating eddy currents in the heater plate, which heats the heater plate, the heater plate heating the liquid into a vapor, the central channel having a longitudinal axis that is aligned with the projection air opening and the outlet at the second end of the cartridge.

2. The vaporizing device of claim 1 wherein the heater plate is aligned with the central channel in the cartridge leading to an outlet.

3. The vaporizing device of claim 1 further including a seal element between the projection and the recess.

4. The vaporizing device of claim 1 further including a manually operated switch on the battery unit for switching on high frequency alternating electric current to the wire coil.

5. A vaporizing device comprising:

a battery unit including a battery unit housing, a battery electrically connected to an electronic controller in the battery unit housing, the electronic controller having a high frequency alternating current generator, and a wire induction coil;

an inhalation sensor electrically connected to the electronic controller;

a recess at a first end of the battery unit housing;

an air inlet in the battery unit housing, and a first air flow path from the inlet to the recess;

a cartridge having a first end attachable to the battery unit;

a projection extending out from the first end of the cartridge;

a second air flow path from a projection air opening in the projection through a single central channel to an outlet at a second end of the cartridge;

the cartridge including a liquid container around the central channel, the liquid container holding a liquid;

a rectangular heater plate in the projection, the heater plate comprising a flat metal mesh, the heater plate at least partially surrounded by the wire induction coil when the cartridge is attached to the battery unit;

a liquid conductor, separate from the heater plate, the liquid conductor contacting the heater plate and configured to wick the liquid from the liquid container to the heater plate;

wherein, when a user inhales on the outlet, the inhalation sensor provides a signal to the electronic controller, which then provides high frequency alternating current to the wire induction coil, creating eddy currents in the heater plate, which heats the heater plate, the heater plate heating the liquid into a vapor, the vapor flowing out of the cartridge through the central channel of the second air flow path of the cartridge; the central channel having a longitudinal axis that is aligned with the projection air opening and the outlet at the second end of the cartridge.

* * * * *